United States Patent
Benthien et al.

(10) Patent No.: US 12,553,458 B2
(45) Date of Patent: Feb. 17, 2026

(54) LOCKING ARRANGEMENT FOR CONNECTING AND INTERLOCKING STRUTS AT A NODE WITHIN A FRAMEWORK

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 493 days.

(21) Appl. No.: 18/071,242

(22) Filed: Nov. 29, 2022

(65) Prior Publication Data

US 2023/0167842 A1 Jun. 1, 2023

(30) Foreign Application Priority Data

Nov. 30, 2021 (EP) ..................... 21211212

(51) Int. Cl.
*F16B 7/02* (2006.01)
*F16B 7/04* (2006.01)
*F16B 7/18* (2006.01)

(52) U.S. Cl.
CPC ............ *F16B 7/025* (2013.01); *F16B 7/0446* (2013.01); *F16B 7/185* (2013.01); *Y10T 403/342* (2015.01)

(58) Field of Classification Search
CPC .................. E04B 1/1903; E04B 1/585; E04B 2001/1957; E04B 2001/1966; E04B 2001/2406; E04B 2001/5856; F16B 7/025; F16B 7/0446; F16B 7/185; F16B 12/2009; F16B 13/0891; F16B 39/023;
(Continued)

(56) References Cited

U.S. PATENT DOCUMENTS 11,649,847 B2 * 5/2023 Halder .................. F16B 39/023
411/312
2021/0131478 A1 5/2021 Halder
2024/0174364 A1 * 5/2024 Benthien .............. B64D 11/003

FOREIGN PATENT DOCUMENTS

DE 2434524 A1 * 1/1976 ............ F16B 7/0446
DE 2607738 A1 * 9/1976 ............ F16B 7/0446
(Continued)

OTHER PUBLICATIONS

European Search Report for Application No. 21211212 dated May 3, 2022.

*Primary Examiner* — Josh Skroupa
(74) *Attorney, Agent, or Firm* — KDW Firm PLLC

(57) ABSTRACT

A locking arrangement for connecting and interlocking rods at a node within a framework includes connection rods and a central node bearing to be engaged from different directions by each of the connection rods at respective mounting ports through plugging each connection rod onto a respective mounting port. The central node bearing is configured with at least one locking element at each mounting port to be actuated between a locked state, in which the at least one locking element resides in an outward position and the respective connection rod plugged onto the respective mounting port is clutched to the central node bearing by the at least one locking element, and an unlocked locked state, in which the at least one locking element resides in an inward position and the respective connection rod is released from the central node bearing.

15 Claims, 13 Drawing Sheets

(58) Field of Classification Search
CPC .......... F16B 2012/403; F16B 2012/446; Y10S
403/04; Y10T 403/34; Y10T 403/341;
Y10T 403/342; Y10T 403/347; Y10T
403/591; Y10T 403/599; Y10T 403/60;
Y10T 403/602
USPC .... 403/169, 170, 171, 176, 322.1, 325, 326,
403/327, DIG. 4; 411/312
See application file for complete search history.

(56) References Cited

FOREIGN PATENT DOCUMENTS

| | | | |
|---|---|---|---|
| DE | 88 07 509 U1 | 8/1988 | |
| DE | 9308677 U1 * | 11/1993 | .............. F16B 7/025 |
| DE | 298 13 772 U1 | 11/1998 | |
| DE | 102017131130 A1 | 6/2019 | |
| DE | 202019106029 U1 | 11/2019 | |
| EP | 0 403 852 A2 | 12/1990 | |

* cited by examiner

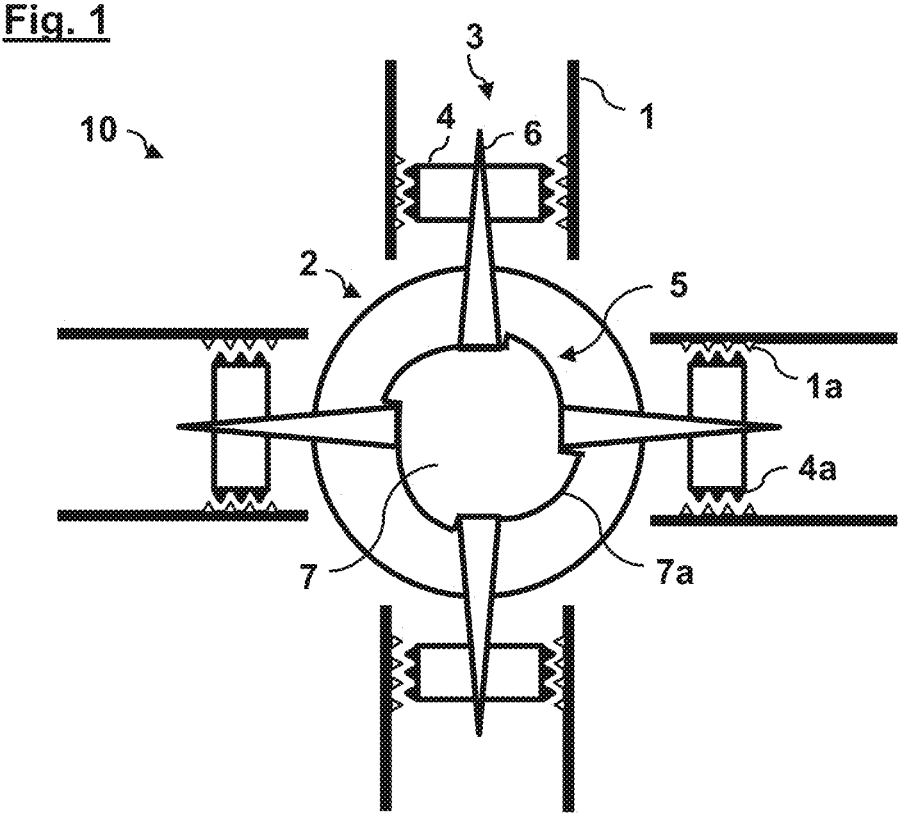
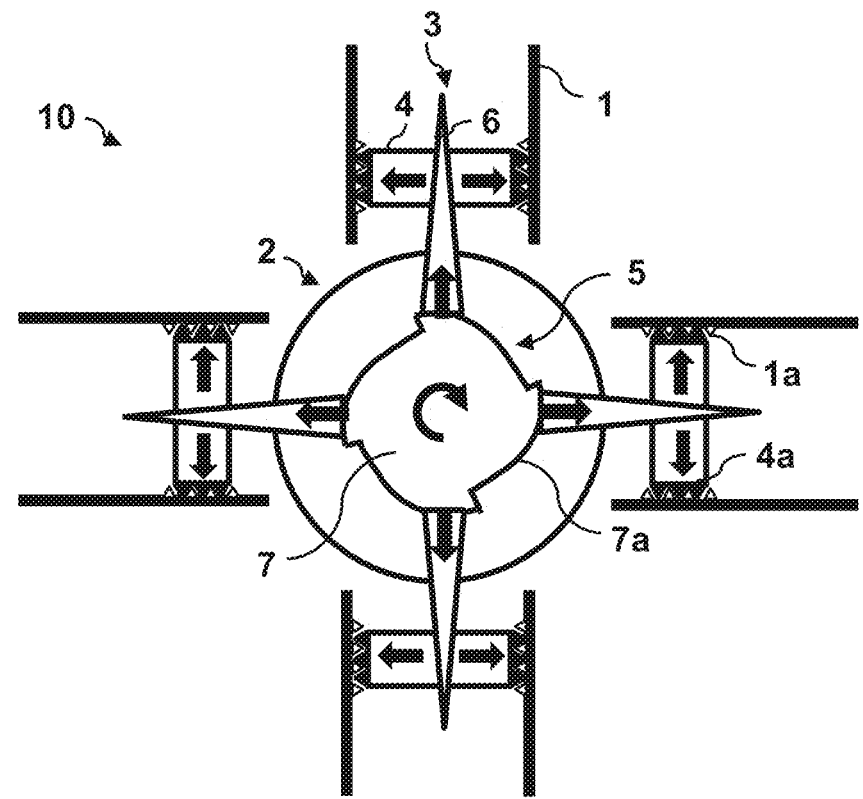

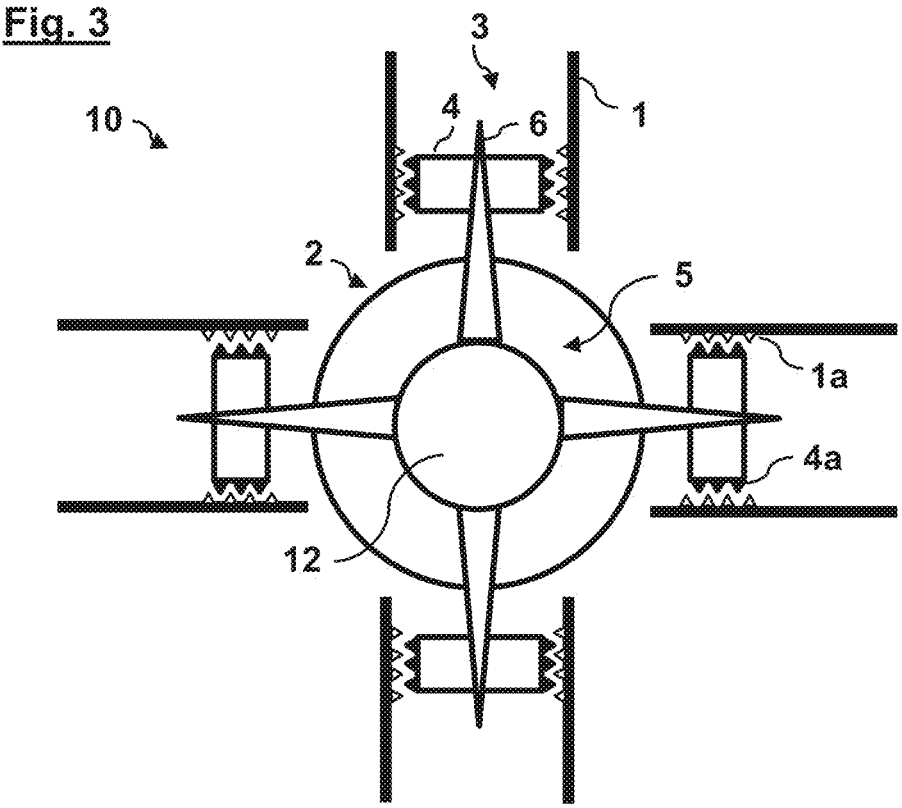
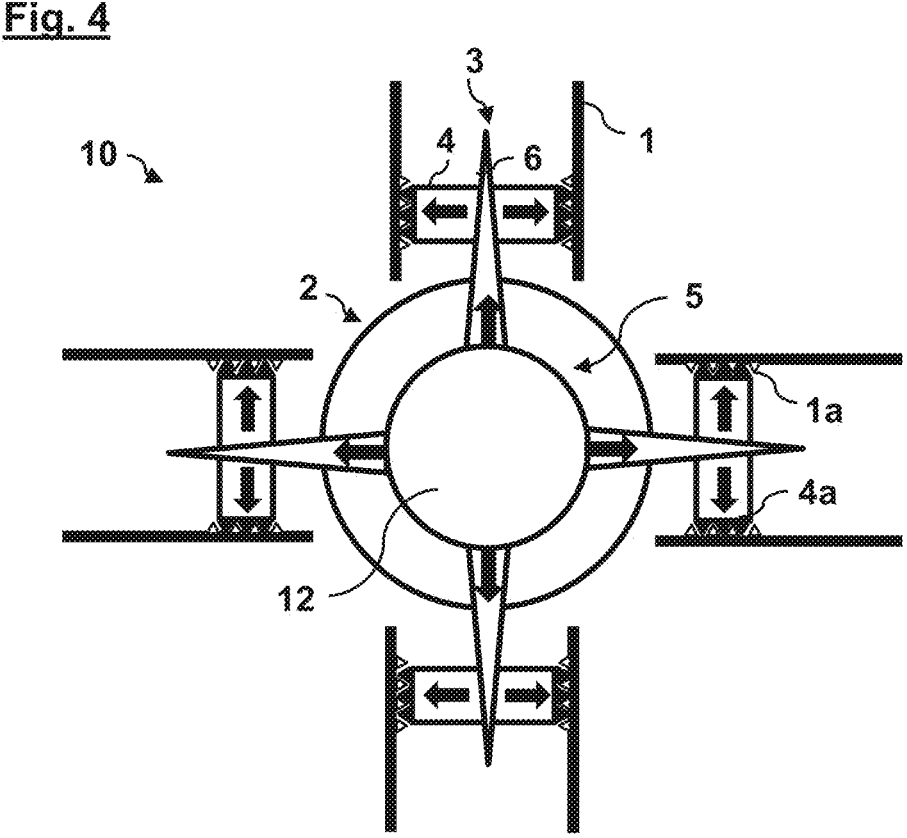

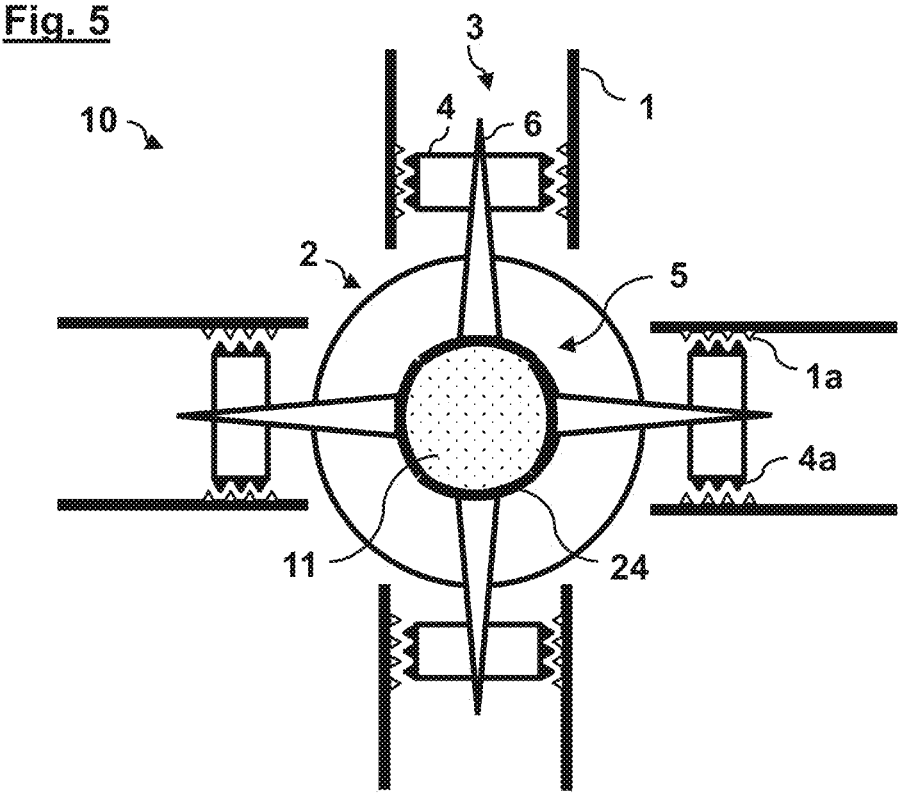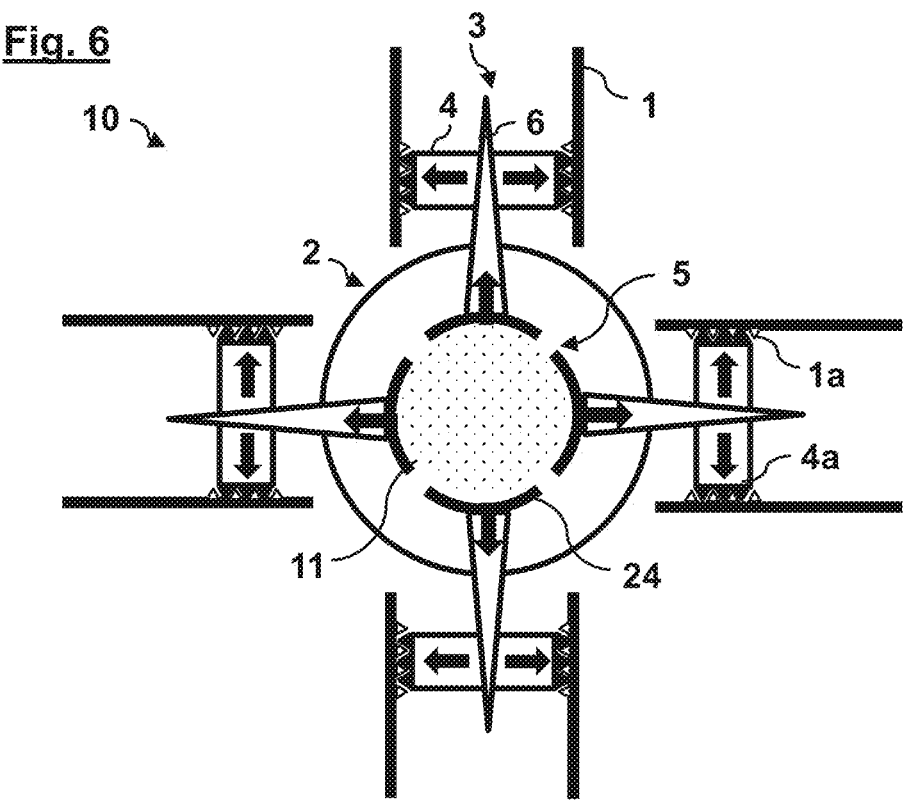

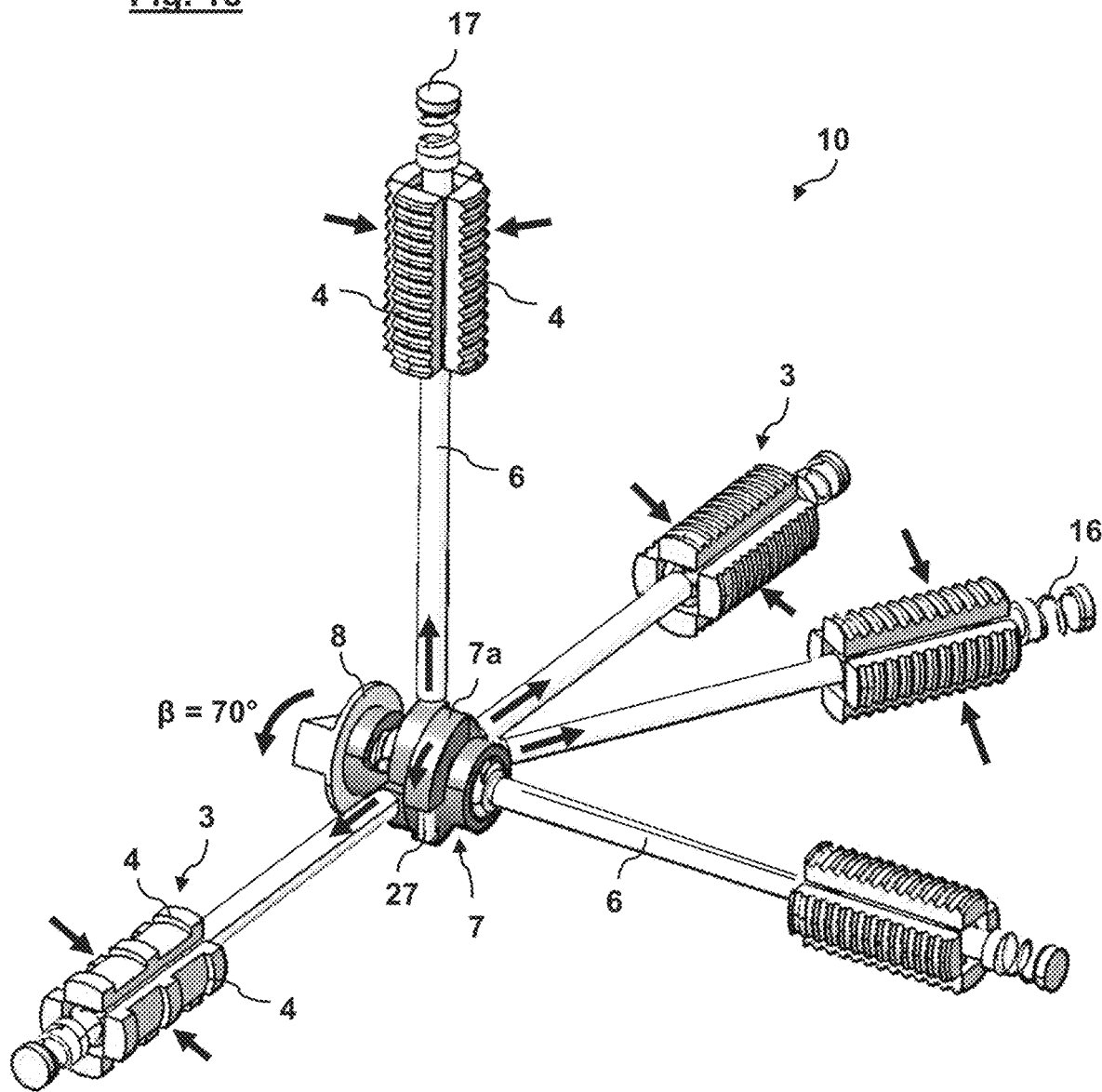

LOCKING ARRANGEMENT FOR CONNECTING AND INTERLOCKING STRUTS AT A NODE WITHIN A FRAMEWORK

TECHNICAL FIELD

The disclosure herein pertains to a locking arrangement for connecting and interlocking rods at a node within a framework.

BACKGROUND

Beams, joists, rods and frames for construction work, for example in aeronautics, civil engineering or architecture, are designed to withstand bending forces acting perpendicular to their direction of extension. These elements are often connected with each other at joints, also referred to as nodes, to build two- or three-dimensional frameworks. Individual connections in these frameworks may be flexurally rigid or articulated, e.g. by pivots or rotary joints. In some applications an articulated connection may be preferred as it may help to compensate for existing tolerances and to avoid eccentricity moments.

Considering the interior architecture of an airplane as an example, e.g. of a large passenger aircraft, a variety of fastening elements, e.g. brackets, holders etc., and a complex arrangement of interconnecting means, e.g. rods, struts etc., are normally used to affix the elements of the passenger cabin (e.g. hat-racks and monuments like galleys and toilets) to the structural airframe of the airplane. Certain manufacturing tolerances are to be expected and need be taken into account in the assembly. A common task arising during such an assembly involves the connection of several rods at a single node of the structural framework, e.g. of a ceiling structure. The mechanism used for this purpose should not only be lightweight but also simple to handle in order to safe lead time and assembly costs.

Prior art document DE 10 2017 131 130 A1 pertains to an example system for attaching a component to a fuselage structure.

Prior art document DE 20 2019 106 029 U1 describes screwable devices with retractable thread segments, which are used to secure a workpiece on a device, on a workbench or the like.

SUMMARY

Against this background, it is an object of the disclosure herein to find simple solutions for connecting and interlocking several rods at a node within a framework.

This object is achieved by a locking arrangement as disclosed herein.

According to the disclosure herein, a locking arrangement for connecting and interlocking rods at a node within a framework comprises several connection rods; and a central node bearing configured to be engaged from different directions by each of the connection rods at respective mounting ports by plugging each connection rod onto a respective mounting port, wherein the central node bearing is configured with at least one locking element at each mounting port to be actuated between a locked state, in which the at least one locking element resides in an outward position and the respective connection rod plugged onto the respective mounting port is clutched to the central node bearing by the at least one locking element, and an unlocked locked state, in which the at least one locking element resides in an inward position and the respective connection rod is released from the central node bearing.

Thus, one idea of the disclosure herein is to provide a single locking point for several connection rods with a central locking mechanism to keep the assembly as simple as possible and thus to reduce installation time as well as weight. The mounting ports may be arranged in a plane, e.g. circularly and/or radially around a center of the node bearing. For example, four mounting ports may be positioned in a circle around the center evenly spaced at 90°. However, mounting ports may also be used to couple one or several interconnecting rods at an oblique angle to the node bearing relatively to the other interconnecting rods. In principle, interconnecting rods may be coupled to the node bearing in an almost arbitrary manner in three dimensions along a spherical shell around the center of the node bearing.

Advantageous embodiments and improvements are disclosed herein.

According to an embodiment of the disclosure herein, the mounting ports may be arranged on the central node bearing such that the connection rods are oriented towards a common center point of the central node bearing when engaged to the mounting ports.

Hence, the mounting ports and thus the interconnecting rods may follow a starlike configuration around a center of the node bearing.

According to an embodiment of the disclosure herein, the locking elements may be configured with a toothed locking surface configured to engage a complementary formed counter locking surface on the respective connection rod.

For example, each locking element may be configured as a plate with a toothed surface. The connection rods may be formed hollow at least at one end (i.e. pipe-like) and may have an inner surface or several surface portions configured with openings or slots to engage with the teeth of the locking elements such that a form fit may be achieved between both elements.

According to an embodiment of the disclosure herein, the central node bearing may be provided with a central actuation system configured to move actuation pins axially into and out of respective mounting ports to actuate the respective at least one locking element between the locked state and the unlocked state.

The presently followed principle of the locking mechanism is inspired by ball lock pins, also called locking pins, safety pins or quick release pins, which are widely used to quickly and easily join and fasten components without the need for tools. Pressing a button in the head of such a pin releases a ball lock allowing the pin to be pushed through a hole in the parts to be joined. When the spring-loaded button is released, the balls lock automatically thereby closing the fastening. In the disclosure herein, the locking elements being actuated centrally by the actuation pins serve the same purpose as the balls in case of ball lock pins. However, in case of the disclosure herein, a plurality of rods may be locked/unlocked at the same time in this manner.

According to an embodiment of the disclosure herein, the actuation pins may be mounted spring-loaded within the mounting ports such that the respective locking elements are normally locked when the connection rods engage the mounting ports.

This embodiment provides advantages with regards to safety, as the actuation mechanism has to be activated in order to release the connection rods from the central node bearing. This means that the rods are firmly locked to the node by default.

According to an embodiment of the disclosure herein, each locking element may rest positionally fixed along an axial direction with an actuation surface radially outside on the respective actuation pin at a complementary formed counter actuation surface such that axial movement of the actuation pin into and out of the respective mounting port moves the locking element radially outwards or inwards from the actuation pin, respectively, to switch between the locked state and the unlocked state.

To this end, the locking elements may be arranged within corresponding holes inside a housing of the mounting ports, e.g. slits in the outer wall of a hollow cylindrical enclosure. The actuation pins may be movable along an axial direction within the interior space of the mounting port below the respective openings or slits for the locking elements. If the actuation surfaces of both the locking elements and the actuation pins are formed adequately, relative sliding movement between the elements may push the locking elements radially outwards and against the respective connection rod, thereby engaging the connection rod by teeth or similar.

According to an embodiment of the disclosure herein, the central actuation system may comprise a rotatable actuation element rotatably mounted in a center portion of the central node bearing and engaging at least one of the actuation pins with a corresponding radial ramp portion. The radial ramp portion may be wedge-shaped in a circumferential direction around the rotational axis of the rotatable actuation element such that the corresponding actuation pin is moved into and out of the corresponding mounting port by the corresponding radial ramp portion under rotation of the rotatable actuation element.

In one specific embodiment, the rotatable actuation element may have several such radial ramp portions arranged along a circumferential direction around the axis of rotation of the actuation element. In this case the actuation element may push several actuation pins that point radially outwards at the same time and thereby actuate the respective locking mechanisms for several connection rods engaging the node bearing in a star-like configuration.

According to an embodiment of the disclosure herein, at least one of the radial ramp portions may have a conically curved radial surface to engage an actuation pin oriented inclined with respect to a radial direction around the rotation axis of the rotatable actuation element.

Hence, the actuation pins and thus the connection rods cannot only be coupled to the node bearing in a radial configuration. Alternatively, or in addition, one or several of the actuation pins (and thus also the corresponding connection rods) may be arranged under an oblique angle to the axis of rotation of the rotatable actuation element. The radial surface of the ramp portions may be shaped adequately so that also actuation pins under an inclined angle may be actuated by rotating the actuation element in the center.

According to an embodiment of the disclosure herein, the central actuation system may comprise a turn knob having an external thread configured to engage an internal thread of the rotatable actuation element along the rotational axis of the rotatable actuation element, wherein the turn knob is configured to move an actuation pin oriented axially along the rotational axis of the rotatable actuation element into and out of a corresponding mounting port by moving in and out of the internal thread, respectively.

This embodiment thus also makes it possible to actuate pins along the rotational axis of the central actuation element. By combining this approach with conveniently shaped ramp portions on the radial outer surface of the actuation element, basically any kind of orientation of the actuation pins can be actuated by simple rotation of the central actuation element and turning of the turn knob.

According to an embodiment of the disclosure herein, the turn knob may be adapted to be turned by a first turning angle within the rotatable actuation element to push the axially oriented actuation pin into the unlocked position and subsequently be turned by a second turning angle jointly with the rotatable actuation element to actuate the further actuation pins via rotation of the rotatable actuation element.

In this particularly advantageous embodiment, all actuation pins can be actuated independently of their orientation merely by turning the turn knob. First the axially oriented actuation pin is pushed into its respective mounting port by turning the turn knob by the first turning angle. As soon as the actuation pins reaches an end stop within the mounting port, further rotation of the turn knob may cause rotation of the actuation element, which in turn will then actuate the remaining actuation pins.

According to an embodiment of the disclosure herein, the central actuation system may be on pneumatic and/or hydraulic expansion using a fluid as actuation medium to move the actuation pins into and out of the corresponding mounting ports.

For example, pressurized air can be used as actuation medium to push the actuation pins outwards from the center of the node bearing. Such an hydraulic and/or pneumatic approach may have benefits, e.g. to actuate pins in any direction, that is, also under oblique angles, without having to provide a mechanical rotation element with potentially complex outer shape.

According to an embodiment of the disclosure herein, the central actuation system may comprise an electroactive polymer as actuation medium to move the actuation pins into and out of the corresponding mounting ports.

For example, a core of the node bearing may include a component made of an electroactive material that expands under application of electricity, which then may be used to push the actuation pins outwards from the center of the node bearing.

According to an embodiment of the disclosure herein, the central actuation system may comprise a rubber block as actuation medium to move the actuation pins into and out of the corresponding mounting ports. Each actuation pin may be coupled to the rubber block via a corresponding push-plate, wherein the rubber block is further coupled to an actuation plate configured to actuate movement of the actuation pins outwards from the rubber block by being pushed into the rubber block.

In one example, metal plates may be attached to a rubber block (flexible yet not very compressible), which keep the actuation pins from pressing into the rubber. When pressure is applied to one of these plates, the other plates necessarily move. Similar to a hydraulic drive, the pressure will spread in all directions and thus may move all pins at the same time.

The disclosure herein will be explained in greater detail with reference to example embodiments depicted in the drawings as appended.

BRIEF DESCRIPTION OF THE DRAWINGS

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. In the figures, like reference numerals denote like or functionally like components, unless indicated otherwise.

FIG. 1 schematically depicts a cross-sectional view of a locking arrangement according to an embodiment of the disclosure herein in an unlocked state.

FIG. 2 shows the locking arrangement of FIG. 1 in a locked state.

FIG. 3 schematically depicts a cross-sectional view of a locking arrangement according to another embodiment of the disclosure herein in an unlocked state.

FIG. 4 shows the locking arrangement of FIG. 3 in a locked state.

FIG. 5 schematically depicts a cross-sectional view of a locking arrangement according to yet another embodiment of the disclosure herein in an unlocked state.

FIG. 6 shows the locking arrangement of FIG. 5 in a locked state.

FIGS. 16, 17 and 18 are perspective views of the locking arrangement of FIG. 11 while switching from a locked to an unlocked state.

DETAILED DESCRIPTION

Figure 7:
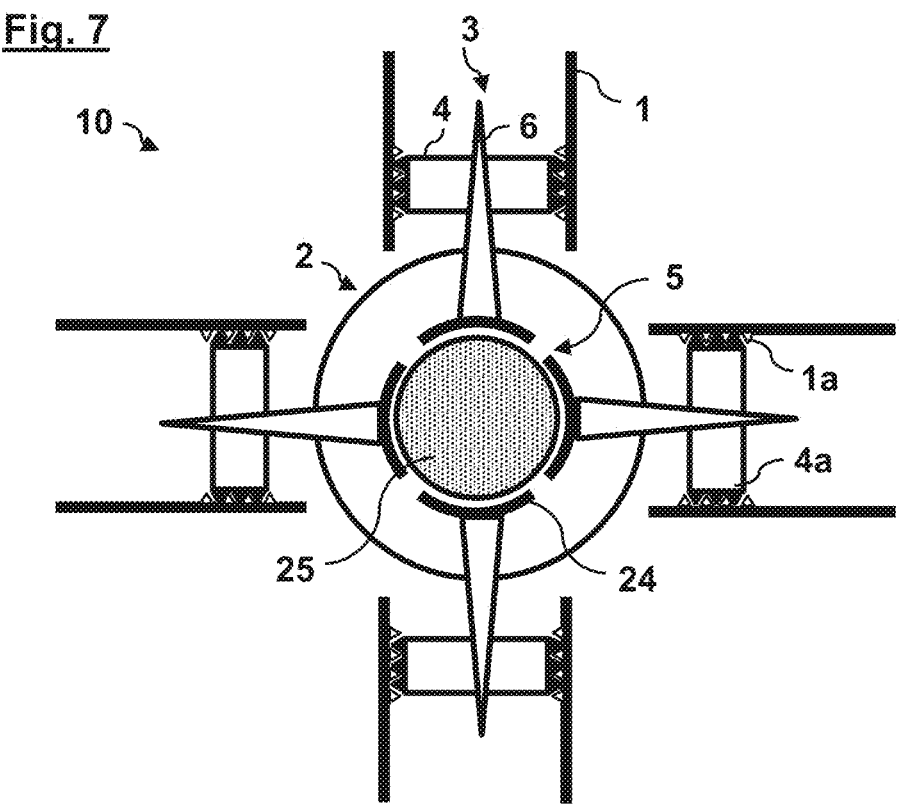
FIG. 7 is another view of the locking arrangement of FIG. 5 in a locked state.

Although specific embodiments are illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

FIG. 1 schematically depicts a cross-sectional view of a locking arrangement 10 according to an embodiment of the disclosure herein in an unlocked state. FIG. 2 shows the locking arrangement 10 of FIG. 1 in a locked state.

This and the other embodiments described in the following are provided as a solution for mounting and locking as many interconnection rods as possible at a single node of a framework, which is more flexible, simpler and consequently lighter than common solutions and yet still quickly to assemble.

The components as disclosed hereinforth may be used in a lot of applications, including—but not limited to—constructions of aircraft interiors, interior design, bridge building, vehicle carriages, civil engineering, applications for children's toys and similar. A particular application pertains to the construction of frameworks in aircraft. Such frameworks include connection rods for bracing a fuselage structure of an aircraft, structurally reinforcing a fuselage structure and/or for fastening a component on the fuselage structure.

The locking arrangements described herein generally comprise several connection rods 1 and a central node bearing 2 configured to be engaged from different directions by each of the connection rods 1 at respective mounting ports 3 by plugging each connection rod 1 onto a respective mounting port 3.

The central node bearing 2 is configured with at least one locking element 4 at each mounting port 3 to be actuated between a locked state, in which the at least one locking element 4 resides in an outward position and the respective connection rod 1 plugged onto the respective mounting port 3 is clutched to the central node bearing 2 by the at least one locking element 4, and an unlocked locked state, in which the at least one locking element 4 resides in an inward position and the respective connection rod 1 is released from the central node bearing 2. The mounting ports 3 are arranged on the central node bearing 2 such that the connection rods 1 are oriented towards a common center point of the central node bearing 2 when engaged to the mounting ports 3.

FIGS. 1 and 2 show an example embodiment of this general configuration. The rods 1 may be hollow (tubular) elongated structures or may at least have a hollow portion at one end, at which the respective rods 1 may be plugged onto the mounting ports 3. As can be seen in the figures, the locking elements 4 are configured with a toothed locking surface 4a configured to engage a complementary formed counter locking surface 1a on the respective connection rods 1.

The central node bearing 2 is provided with a central actuation system 5 configured to move actuation pins 6 axially into and out of respective mounting ports 3 to actuate the respective at least one locking element 4 between the locked state and the unlocked state.

In the example embodiment of FIGS. 1 and 2, the central actuation system 5 follows a mechanical approach to move four connection rods 1 between locked and unlocked states. More specifically, the central actuation system 5 comprises a rotatable actuation element 7 rotatably mounted in a center portion of the central node bearing 2 and engaging the four actuation pins 6 with corresponding radial ramp portions 7a. The radial ramp portions 7a are wedge-shaped in a circumferential direction around the rotation axis of the rotatable actuation element 7 (pointing into the drawing) such that the corresponding actuation pin 6 is moved into and out of the corresponding mounting port 3 by the corresponding radial ramp portion 7a under rotation of the rotatable actuation element 7.

The example embodiment of FIGS. 1 and 2 thus has a normally unlocked configuration, i.e. the pins 6 have to be pushed outwards from the center of the node bearing to close a form fit between the toothed locking surfaces 4a of the locking elements and the toothed counter locking surface of the connection rods 1a (cf. arrows in FIG. 2) and thereby lock the arrangement.

A more detailed embodiment of this mechanical approach will be described further below with respect to FIGS. 9 to 18.

In principle however, the central actuation system 5 may also be realized by other than mechanical means and/or by a combination of several different techniques.

FIGS. 3 and 4 schematically show an alternative embodiment, in which the central actuation system 5 comprises a core of electroactive polymer 12 as actuation medium to move the actuation pins 6 into and out of the corresponding mounting ports 3. For example, the electroactive polymer 12 may expand under the application of electric power, which will then push the actuation pins 6 outward from the center of the node bearing 2, thereby closing the locking mechanism between the locking elements 4 and the connection rods 1.

FIGS. 5 and 6 show an alternative embodiment, in which the central actuation system 5 is based on hydraulic expansion using a gas or a liquid as actuation medium to move the actuation pins 6 into and out of the corresponding mounting ports 3. For example, pressurized air may be used for this purpose, as it is typically widely available at construction sites. In the shown embodiment, the actuation rods 6 are positioned on shell segments 24, which form a closed volume in the unlocked state (FIG. 5) and can be moved outwards by applying pressure to the fluid 11, thereby locking the connection rods 1 to the mounting ports 3. To fix the arrangement in the locked state, a plug 25 may be entered between the shell segments 24 to keep them from falling back to the center.

Figure 8:
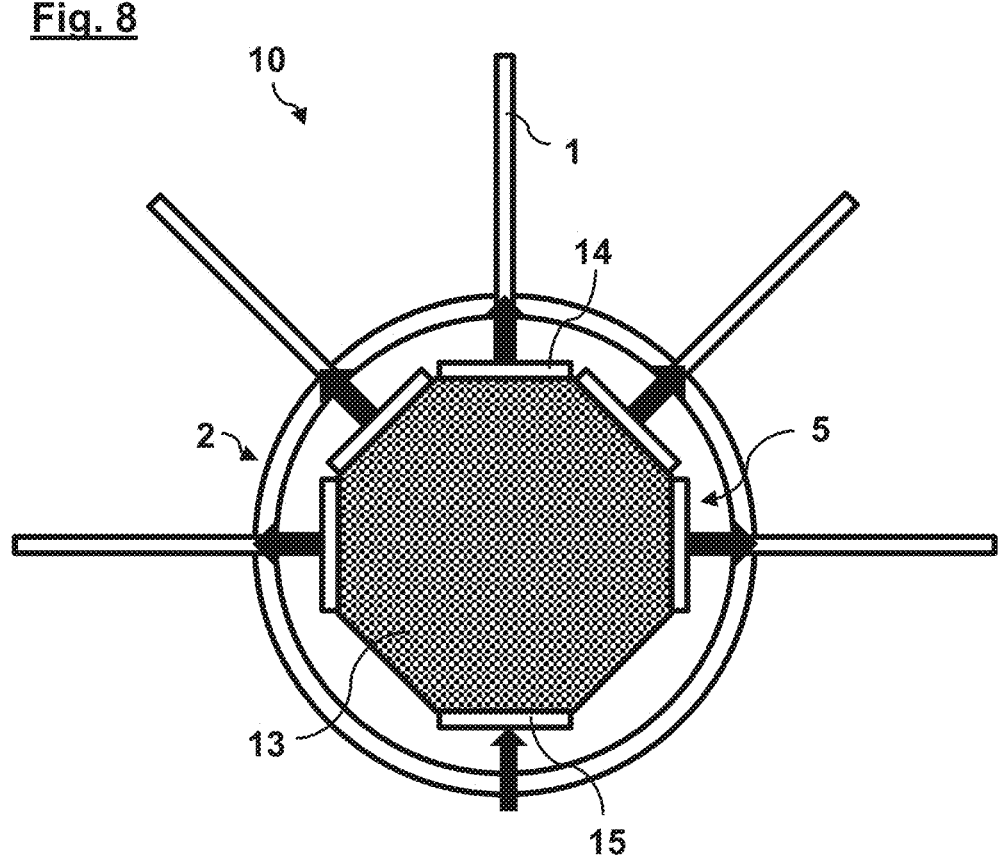
FIG. 8 schematically depicts a cross-sectional view of a locking arrangement according to yet another embodiment of the disclosure herein.

Yet another alternative approach is exemplified in FIG. 8. In this case, the central actuation system 5 comprises a rubber block 13 as actuation medium to move the actuation pins 6 into and out of the corresponding mounting ports 3. Each actuation pin 6 is coupled to the rubber block 13 via a corresponding push plate 14, e.g. a metal plate. The rubber block 13 is further coupled to an actuation plate 15, e.g. also a metal plate, configured to actuate movement of the actuation pins 6 outwards from the rubber block 13 by being pushed into the rubber block 13 (cf. arrows in FIG. 8).

With reference to FIGS. 9 to 18 an embodiment is detailed now that follows the mechanical approach of FIGS. 1 and 2. Contrary to the embodiment of FIGS. 1 and 2, the actuation pins 6 in this case are spring-loaded within the mounting ports 3 such that the respective locking elements 4 are normally locked when the connection rods 1 engage the mounting ports 3. This provision makes the arrangement safer and thus better suited for safety relevant applications, e.g. in the aerospace sector.

Figure 9:
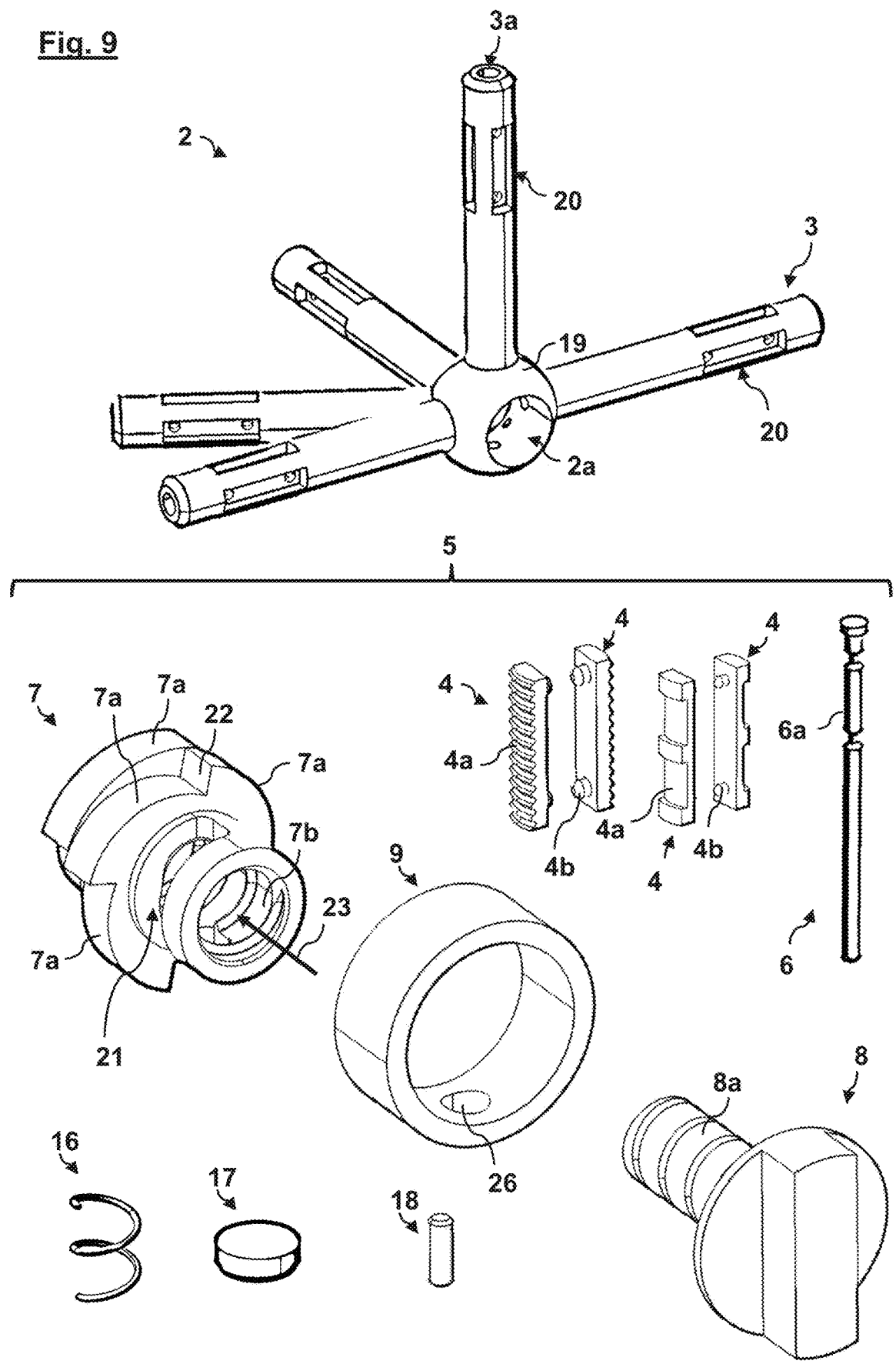
FIG. 9 is a perspective view of the components of a locking arrangement according to yet another embodiment of the disclosure herein.
Figure 10:
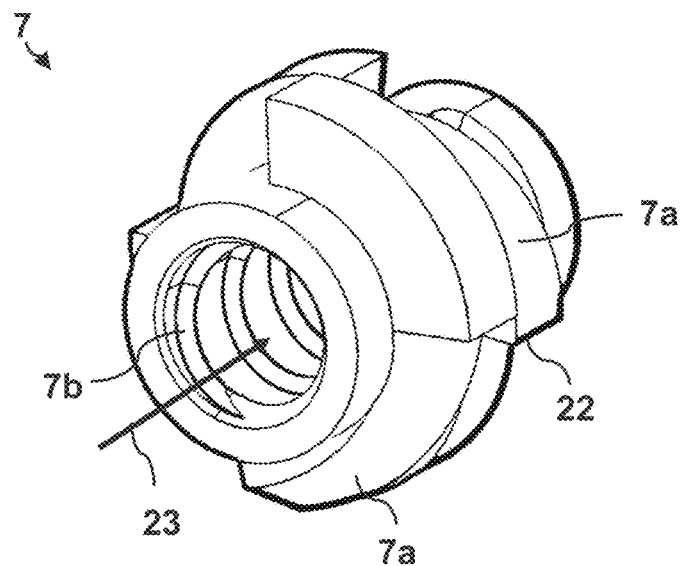
FIG. 10 is a perspective view of a rotatable actuation element from the components shown in FIG. 9.
Figure 11:
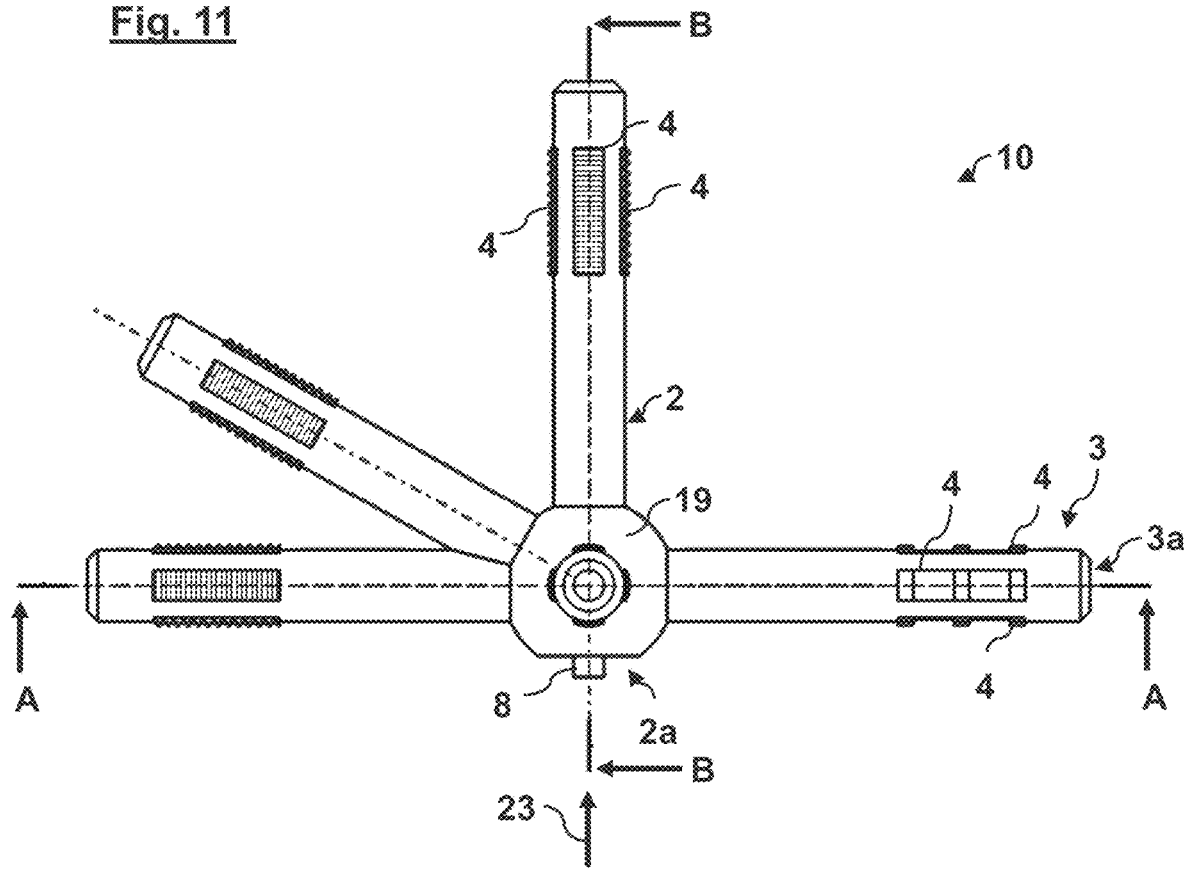
FIG. 11 is a top view of an assembled locking arrangement based on the components of FIG. 9.
Figure 12:
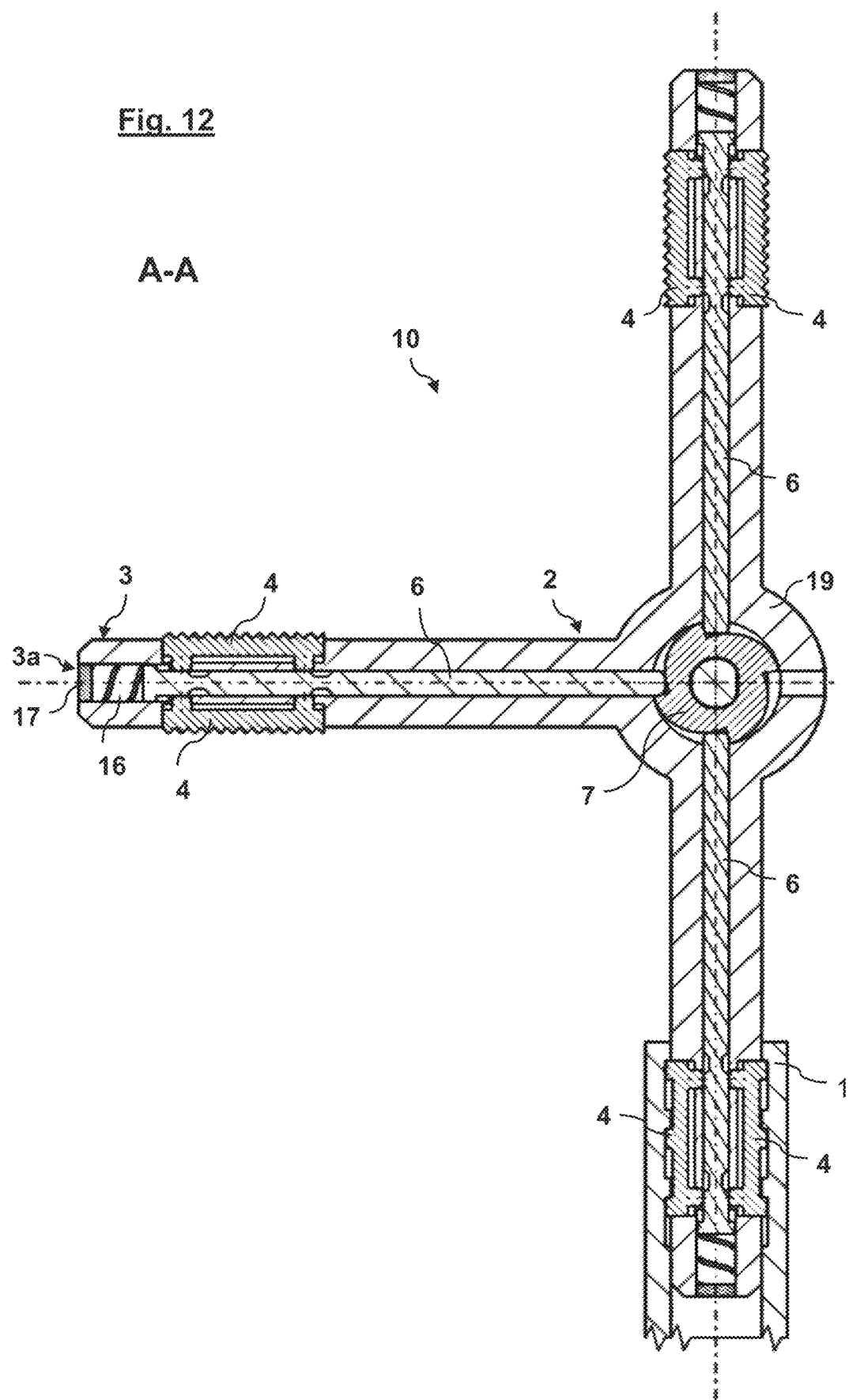
FIG. 12 is a cross-sectional view of the locking arrangement of FIG. 11 in a locked state.
Figure 13:
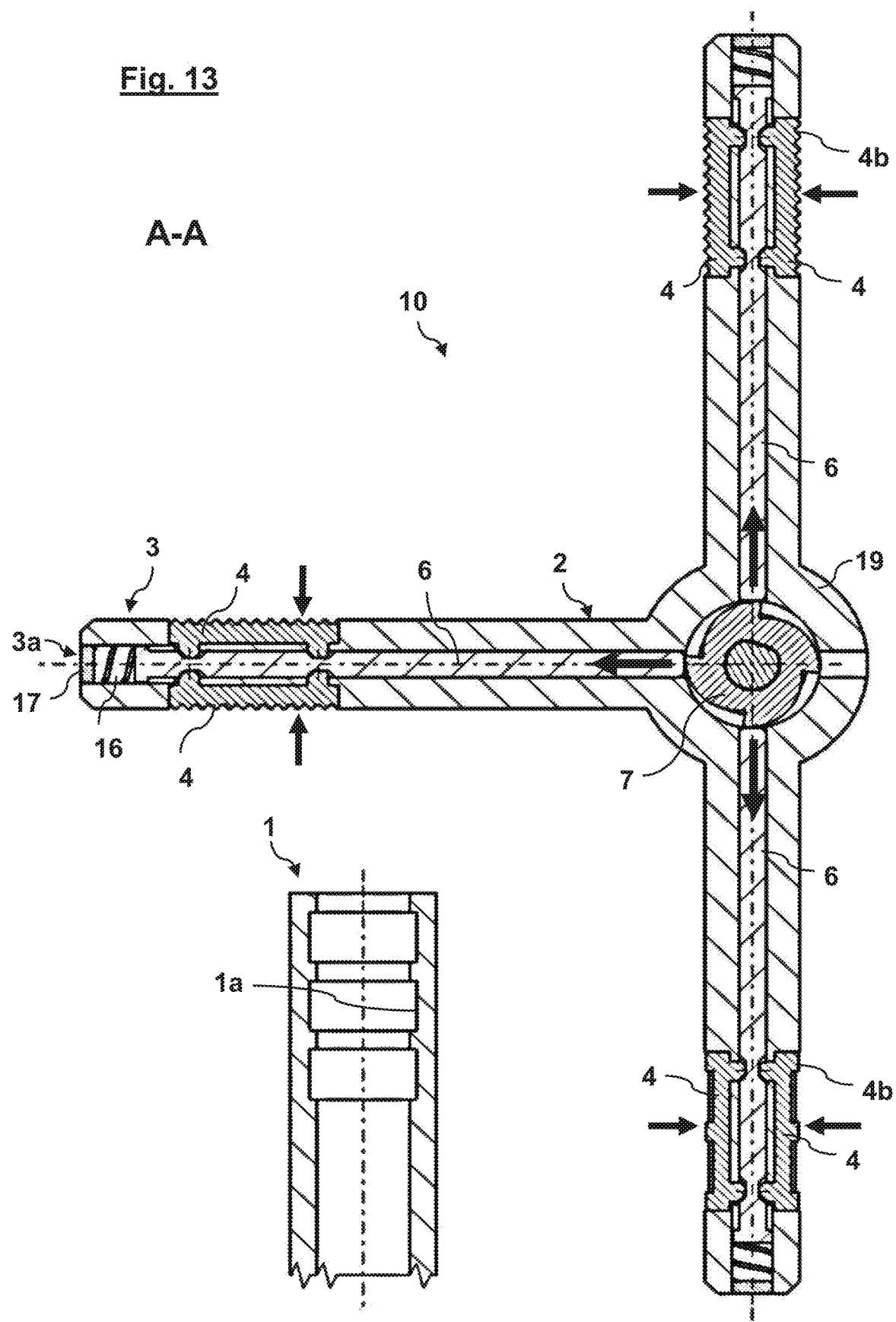
FIG. 13 shows the view of FIG. 12 for an unlocked state.
Figure 14:
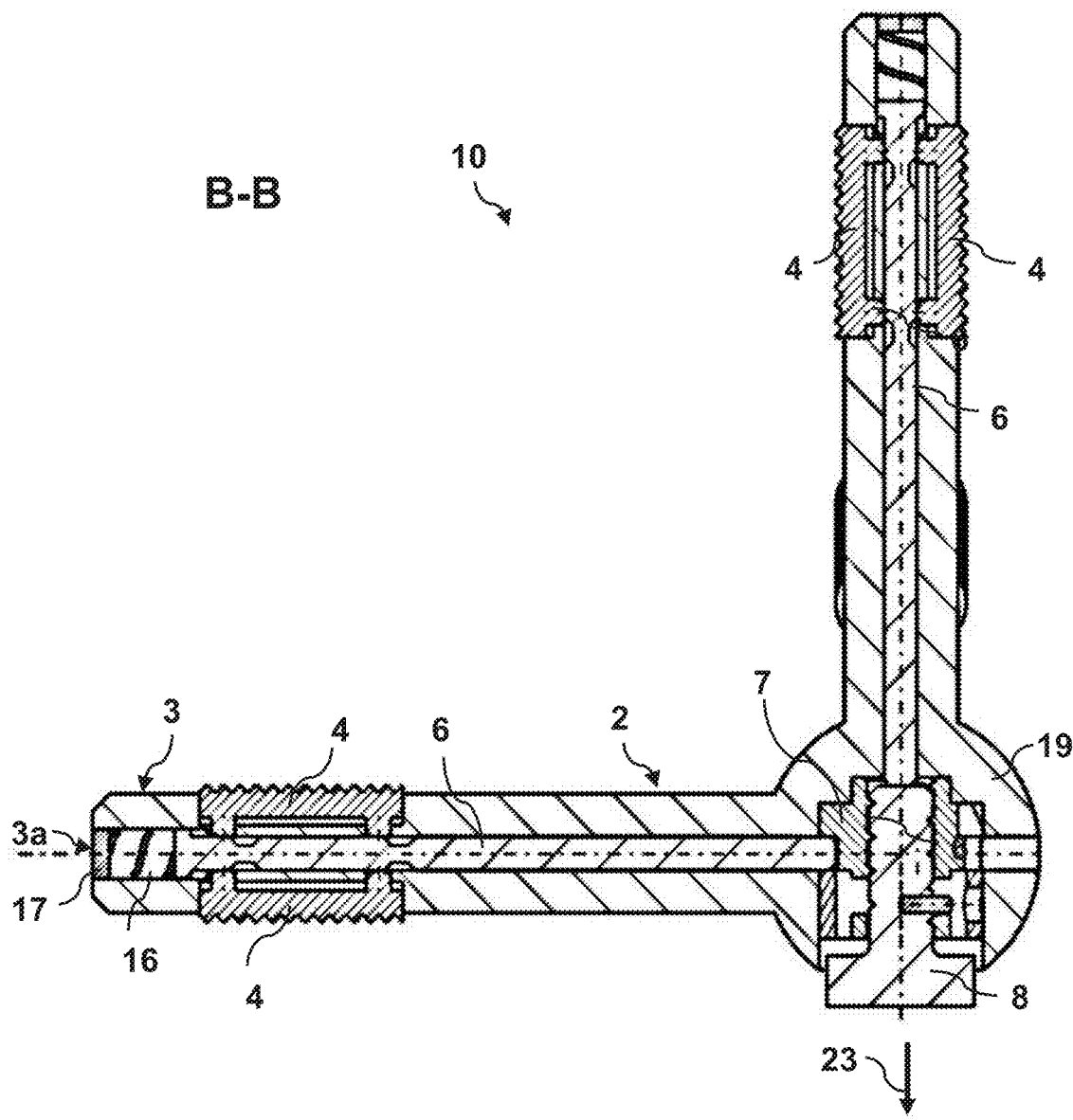
FIG. 14 is another cross-sectional view of the locking arrangement of FIG. 11 in a locked state.
Figure 15:
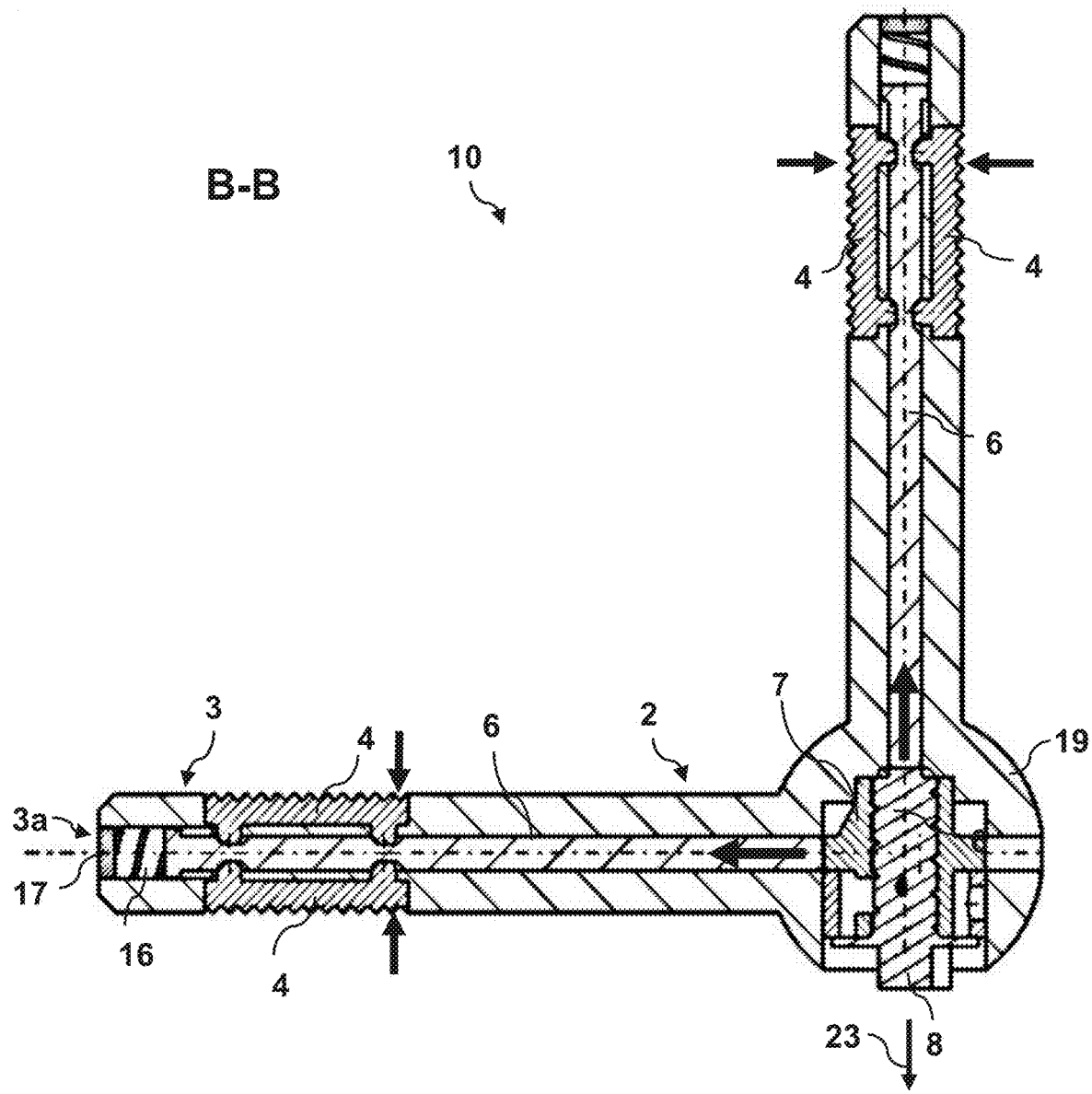
FIG. 15 shows the view of FIG. 14 for an unlocked state.

The individual components used in the arrangement 10 are shown in FIG. 9 (the connection rods 1 are not shown, however cf. FIGS. 12 and 13). As can be seen, the central node bearing 2 has a rigid node housing 19 surrounding a center portion 2a and five elongated hollow mounting ports 3. Four of them are arranged under 90° with respect to each other (three in a horizontal plane in FIG. 9, one vertically upright with respect to these). A fifth one is oriented in the horizontal plane at an inclined angle with respect to the others.

Each mounting port 3 has four port holes 20 in its outer walls to receive the locking elements 4 as well as a port end hole 3a at a distal end to receive a respective connection pin 6, a spring 16 and finally a cap 17 to shut off the assembly. Each locking element rests 4 with an actuation surface 4b radially outside on the respective actuation pin 6 at a complementary formed counter actuation surface 6a such that axial movement of the actuation pin 6 into and out of the respective mounting port 3 moves the locking element 4 radially outwards or inwards from the actuation pin 6, respectively.

As can be seen in FIG. 9, for example, the locking elements 4 of this embodiment have two pins on their respective actuation surfaces 4b, whereas the actuation pins 6 have two correspondingly formed grooves on their counter actuation surfaces 6a. Hence, in case that one of the actuation pins 6 slides along its corresponding locking elements 4, the pins of the locking elements 4 will enter the grooves at some point, thereby bringing the locking elements 4 closer to the actuation pins 6, which thus can be used to lock and unlock the arrangement (cf. FIGS. 13 and 15 in particular).

As an example, two different types of locking elements 4 are shown in FIG. 9. One type has a toothed locking surface 4a that is covered by a plurality of equally spaced narrow teeth with a distance that basically corresponds to the width of the teeth. The other one has only three teeth arranged on the locking surface 4a with a distance much larger than their width, thereby leaving some free play for the mounting process of the connection rods 1, which may be provided with a counter locking surface 1a having respectively formed grooves (cf. FIGS. 12 and 13, where only on example connection rod 1 is shown).

The center portion 2a of the node bearing 2 is configured to receive a rotatable actuation element 7 similarly designed as the one in FIGS. 1 and 2, which is mounted inside the center portion by a bearing ring 29, wherein a mounting pin 18 introduced through a mounting hole 26 in the bearing ring 29 enters a mounting slot 21 in the actuation element 7 to couple it to the bearing ring 29. The mounting slot 21 is elongated in a circumferential direction of the actuation element 7 so that the actuation element 7 can be rotated against the bearing ring 29 to some extent.

Contrary to the embodiment in FIGS. 1 and 2, in this case the actuation element 7 has a first disk-like portion with three radial ramp portions 7a for actuating three of the actuation pins 6, namely the vertical one as well as the left and right horizontal ones in FIG. 9. In addition, the actuation element 7 has a second disk-like portion with another radial ramp portion 7a having a conically curved radial surface to engage an actuation pin 6 inclined with respect to a radial direction around the rotation axis 23 of the rotatable actuation element (in the back on the left of the actuation element 7 in FIG. 9, which is a front view of the actuation element 7, and in the lower right in the front of FIG. 10, which is a back view of the actuation element 7). Hence, the depicted actuation element is in fact able to actuate four of the five actuation pins 6 merely by rotating around its rotation axis 23 (cf. FIGS. 13, 15 and 18 in particular). Ramp edges 22 of the radial ramp portions 7a may serve as dedicated stops for the actuation pins 6 against the actuation element 7 in the locked configuration.

The central actuation system 5 further comprises a turn knob 8 having an external thread 8a configured to engage an internal thread 7b of the rotatable actuation element 7 along the rotation axis 23 of the rotatable actuation element 7. The turn knob 8 is configured to move the actuation pin 6 oriented axially along the rotation axis 23 of the rotatable actuation element 7 into and out of a corresponding mounting port 3 by moving in and out of the internal thread 7b, respectively (the mounting port 3 pointing to the back in FIG. 9).

The turn knob 8 is adapted to be turned by a first turning angle α within the rotatable actuation element 7 to push the axially oriented actuation pin 6 into the unlocked position and subsequently be turned by a second turning angle β jointly with the rotatable actuation element 7 to actuate the further actuation pins 6 via rotation of the rotatable actuation element 7.

Figure 16:
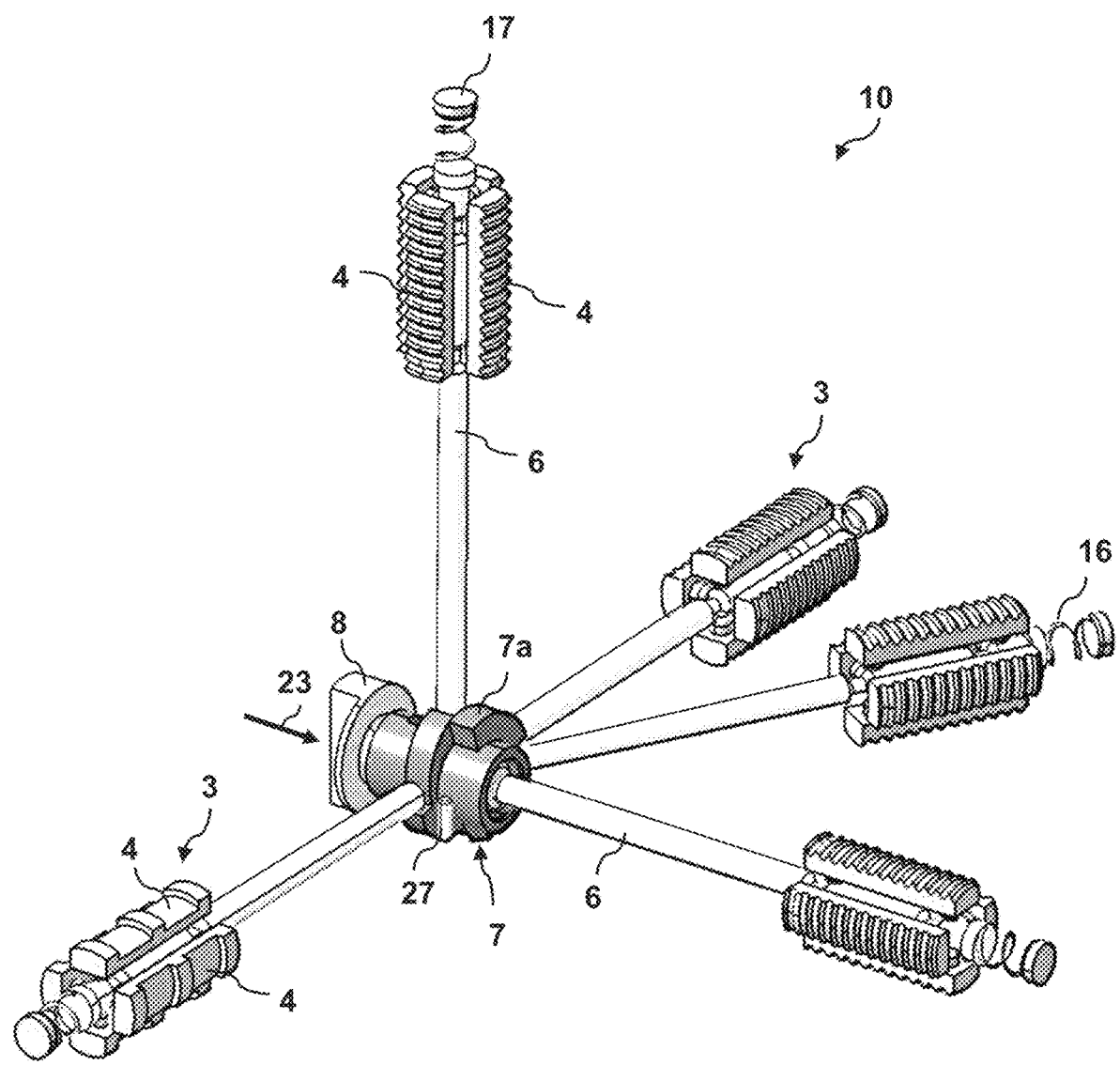
Figure 17:
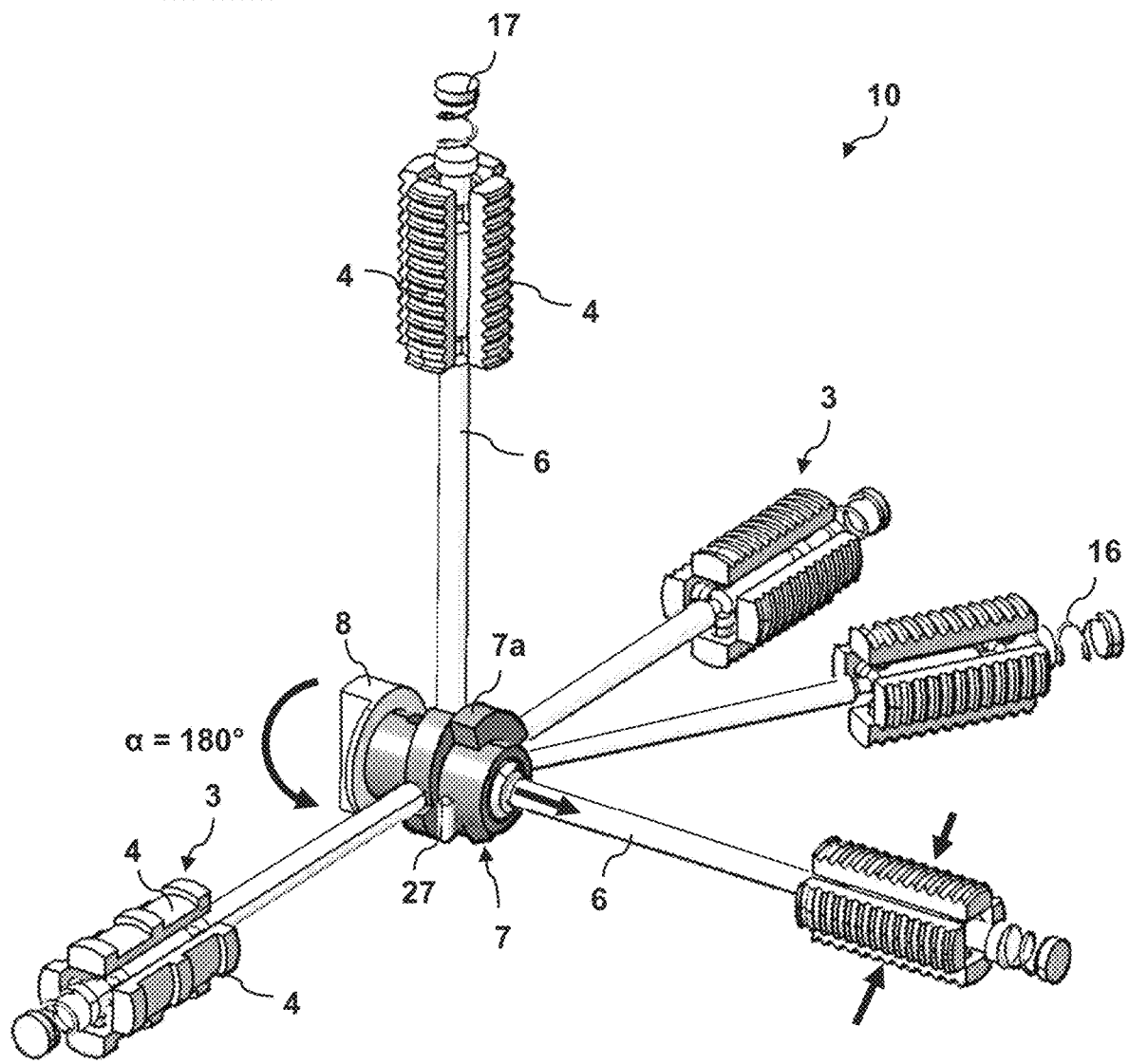

This working principle is demonstrated with reference to FIGS. 16 to 18. For the sake of clarity, the node housing 19 is not shown in these figures.

FIG. 16 shows the default (normal) configuration of the arrangement 10, in which all connection rods 1 are locked to the mounting ports 3 (cf. locking elements 4 at each mounting port in FIG. 16, which are expanded with respect to each other). In this configuration, the springs 16 provide a pre-load against any movement of the actuation pins 6 outwards into the mounting ports 3 such that the arrangement is normally closed (the actuation surfaces 4b and counter actuation surfaces 6a as well as the port holes 20 and actuation pin 6 dimensions and geometries need to be adjusted to each other in order to ensure this).

Coming now to FIG. 17, the turn knob 8 is rotated into the rotatable actuation element 7, thereby pushing the axially oriented actuation pin 6 against its spring 16, until the respective locking elements 4 enter the unlocked configuration, e.g. after a first turning angle of α=180° (cf. arrows in FIG. 17).

As soon as the unlocked position is reached, further rotation of the turn knob 8 will then lead to a rotation of the rotatable actuation element 7, as can be seen in FIG. 18. This then will bring the locking elements 4 of the remaining mounting ports 3 into the unlocked position, e.g. after a second turning angle of β=70°. A dedicated stop pin 27 may be provided that defines the maximum turning angle of the actuation element 7.

The locking arrangement 10 is thus now completely unlocked after two simple manual steps and the connection rods 1 can be removed from the node bearing 2. By rotating the turn knob 8 back by 250°, the locked configuration can be re-established in a simple manner.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the disclosure herein and its practical applications, to thereby enable others skilled in the art to best utilize the disclosure herein and various embodiments with various modifications as are suited to the particular use contemplated.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 connection rod
1a counter locking surface
2 central node bearing
2a center portion
3 mounting port
3a port end hole
4 locking element
4a toothed locking surface
4b actuation surface
5 central actuation system
6 actuation pin
6a counter actuation surface
7 rotatable actuation element
7a radial ramp portion
7b internal thread
8 turn knob
8a external thread
9 bearing ring
10 locking arrangement
11 fluid
12 electro active polymer
13 rubber block
14 push plate
15 actuation plate
16 spring
17 cap
18 mounting pin
19 node housing
20 port hole
21 mounting slot
22 ramp edge
23 rotation axis
24 shell segment
25 plug
26 mounting hole
27 stop pin
α first turning angle
β second turning angle

The invention claimed is:

1. A locking arrangement for connecting and interlocking rods at a node within a framework, the locking arrangement comprising:
a plurality of connection rods;
a central node bearing with a central actuation system comprising:
a rotatable actuation element that comprises, on an outer circumferential surface thereof, radial ramp portions; and
actuation pins;
wherein the central node bearing is configured to be engaged from different directions by each of the connection rods at respective mounting ports by plugging each of the connection rods onto a respective mounting port; and
a plurality of locking elements, at least one of which is at each of the respective mounting ports:
wherein each of the actuation pins is positioned to engage with a corresponding one of the radial ramp portions;
wherein the rotatable actuation element is configured to rotate and, as the rotatable actuation element rotates, the actuation pins are each engaged by the corresponding one of the radial ramp portions and moved radially outwards to engage with a corresponding one of the locking elements;
wherein each of the locking elements is configured to be actuated between:
a locked state, in which the locking element resides in an outward position and a respective one of the connection rods plugged onto the respective mounting port is clutched to the central node bearing by the locking element; and an unlocked state, in which the locking element resides in an inward position and the respective one of the connection rods is released from the central node bearing;

wherein radial movement of the actuation pins away from a center point of the central node bearing causes the corresponding one of the locking elements to move from the unlocked state towards the locked state; and wherein radial movement of the actuation pins towards the center point of the central node bearing causes the corresponding one of the locking elements to move from the locked state towards the unlocked state.

2. The locking arrangement according to claim 1, wherein:

the center point of the central node bearing is a common center point for the connection rods; and the mounting ports are arranged on the central node bearing such that the connection rods are oriented towards a common center point of the central node bearing when engaged at the respective mounting ports.

3. The locking arrangement according to claim 1, wherein each locking element of the plurality of locking elements is configured with a toothed locking surface configured to engage a complementarily formed counter locking surface on a respective one of the connection rods with which each locking element is respectively engaged.

4. The locking arrangement according to claim 1, wherein each of the actuation pins is movable axially into and out of a respective one of the mounting ports to actuate the corresponding one of the locking elements between the locked state and the unlocked state.

5. The locking arrangement according to claim 4, wherein the actuation pins are mounted spring-loaded within the respective mounting ports, such that the locking elements are biased into the locked state when the connection rods engage the mounting ports.

6. The locking arrangement according to claim 4, wherein:

each locking element rests positionally fixed along an axial direction of a corresponding one of the connection rods in which each such locking element is located;

each of the actuation pins comprise an actuation surface, formed on a radially outer surface thereof;

each of the locking elements comprise a counter actuation surface, which is formed complementarily to the actuation surface of the actuation pin by which the locking element is engaged, such that axial movement of the actuation pin into and out of the respective mounting port moves the locking element radially outwards or inwards from the actuation pin, respectively, to switch between the locked state and the unlocked state.

7. The locking arrangement according to claim 4, wherein:

the rotatable actuation element is rotatably mounted in a center portion of the central node bearing; and the radial ramp portions are wedge-shaped in a circumferential direction around a rotation axis of the rotatable actuation element to move the corresponding actuation pin into and out of a corresponding one of the mounting ports when the rotatable actuation element rotates.

8. The locking arrangement according to claim 7, wherein at least one of the radial ramp portions has a conically curved radial surface to engage at least one of the actuation pins that is oriented inclined with respect to a radial direction around the rotation axis of the rotatable actuation element.

9. The locking arrangement according to claim 7, wherein:

the central actuation system comprises a turn knob having an external thread configured to engage an internal thread of the rotatable actuation element along the rotation axis of the rotatable actuation element; and the turn knob is configured to move the actuation pins, which are oriented axially along the rotation axis of the rotatable actuation element, into and out of a corresponding one of the mounting ports by the external thread of the turn knob moving in and out of the internal thread, respectively.

10. The locking arrangement according to claim 9, wherein the turn knob is configured for turning by a first turning angle within the rotatable actuation element to push the axially oriented actuation pin into the unlocked position and, subsequently, by a second turning angle jointly with the rotatable actuation element to actuate further actuation pins via rotation of the rotatable actuation element.

11. The locking arrangement of claim 10, wherein the first turning angle is in a same direction as the second turning angle.

12. The locking arrangement according to claim 1, wherein:

rotation of the rotatable actuation element in a first direction causes all of the locking elements to move towards the locked state; and rotation of the rotatable actuation element in a second direction causes all of the locking elements to move towards the unlocked state.

13. The locking arrangement according to claim 1, wherein axial movement of each of the actuation pins is proportional to a magnitude of rotation of the rotatable actuation element.

14. The locking arrangement of claim 1, wherein the radial ramp portions are spaced apart from each other in a circumferential direction of the rotatable actuation element.

15. The locking arrangement of claim 14, wherein the radial ramp portions are equidistantly spaced apart from each other in the circumferential direction.

* * * * *